Feb. 20, 1973 — O. C. PARROTT ET AL — 3,717,256

FILTER FRAME CONSTRUCTION

Filed Dec. 11, 1970

*INVENTOR.*
ORVILLE C. PARROTT
GEORGE W. YOUNG

BY

United States Patent Office 3,717,256
Patented Feb. 20, 1973

1

3,717,256
FILTER FRAME CONSTRUCTION
Orville C. Parrott and George W. Young, Fern Creek, Ky., assignors to American Air Filter Company, Inc., Louisville, Ky.
Filed Dec. 11, 1970, Ser. No. 97,258
Int. Cl. B01d 25/06
U.S. Cl. 210—495
3 Claims

ABSTRACT OF THE DISCLOSURE

A filter assembly including a rectangular filter frame with filter medium disposed therein, a border flange arranged to engage the edge of the filter frame, the border flange having a terminal filter medium restraining portion extending therefrom to restrain the periphery of filter medium disposed in the frame, and rod means extending between diametrically opposed corners of the border flange size in length to retain the border flange on the frame with the extremities of the rod means connecting the restraining portions of the border flange.

BACKGROUND OF THE INVENTION

The present invention relates to filter assembly construction and more particularly to a border flange and brace arrangement for a filter frame.

In the art of fluid filtration it is desirable to mount fluid treating filter medium into a sturdy frame which can be readily handled during operation and storage. It further is desirable that such a frame present a minimum of sharp corners to reduce problems of cutting and tearing. These filter frame attributes are particularly desirable wherein filter medium of considerable depth is utilized, such as in filter construction where the filter medium extends back and forth in pleated fashion across the fluid stream to be treated with the walls of the pleated filter medium being held in spaced relation with respect to each other by spacer members. Such type of filter construction is most commonly used for high efficiency filtration with the frames often being of rigid non-metallic materials. With frames of this nature it not only is important that the frame construction be sturdy, but it is equally important that blowing and racking be minimized as well as fluid leakage between the several parts of the construction.

SUMMARY OF THE INVENTION

The present invention provides a new, useful and unobvious filter frame construction which lends itself to straight-forward and economical assembly and handling, minimizing past problems of bowing, edge damage, cutting, wear, fluid leakage, racking and, at the same time, insuring positive maintenance of the fluid treating filter medium within the support frame.

Various other features of the present invention will become obvious to one skilled in the art upon reading the disclosure set forth herein.

More particularly, the present invention provides a unit filter assembly comprising: a rectangular filter frame including upstream and downstream edges defining open upstream and downstream faces to permit fluid flow therethrough; a filter medium disposed within the frame transverse the direction of fluid flow between the upstream and downstream faces; a rectangular border flange for the filter frame, the flange having a base portion and a pair of opposed inner and outer leg portions extending therefrom, the base portion being of a breadth substantially equal to the thickness of the filter frame to abut against the edge thereof with the inner and outer leg portions of the flange abutting against the inner and outer surfaces of the filter frame respectively, the inner leg portion having a terminal filter medium restraining portion extending normal therefrom to restrain the periphery of the face of the filter medium disposed in the filter frame, the extremities of the terminal restraining portion of one pair of sides of the border flange overlapping the extremities of the terminal restraining portion of the other pair of sides of the border flange at the corners thereof; and rod means extending between diametrically opposed corners of the border flange, the rod means being sized in length to retain the border flange on the frame with the extremities of the rod means connecting the overlapping extremities of the terminal restraining portion.

It is to be understood that various changes can be made in the arrangement, form and construction of the apparatus set forth herein without departing from the scope or spirit of the present invention.

Referring to the drawing which discloses one advantageous embodiment of the present invention:

Figure 1:
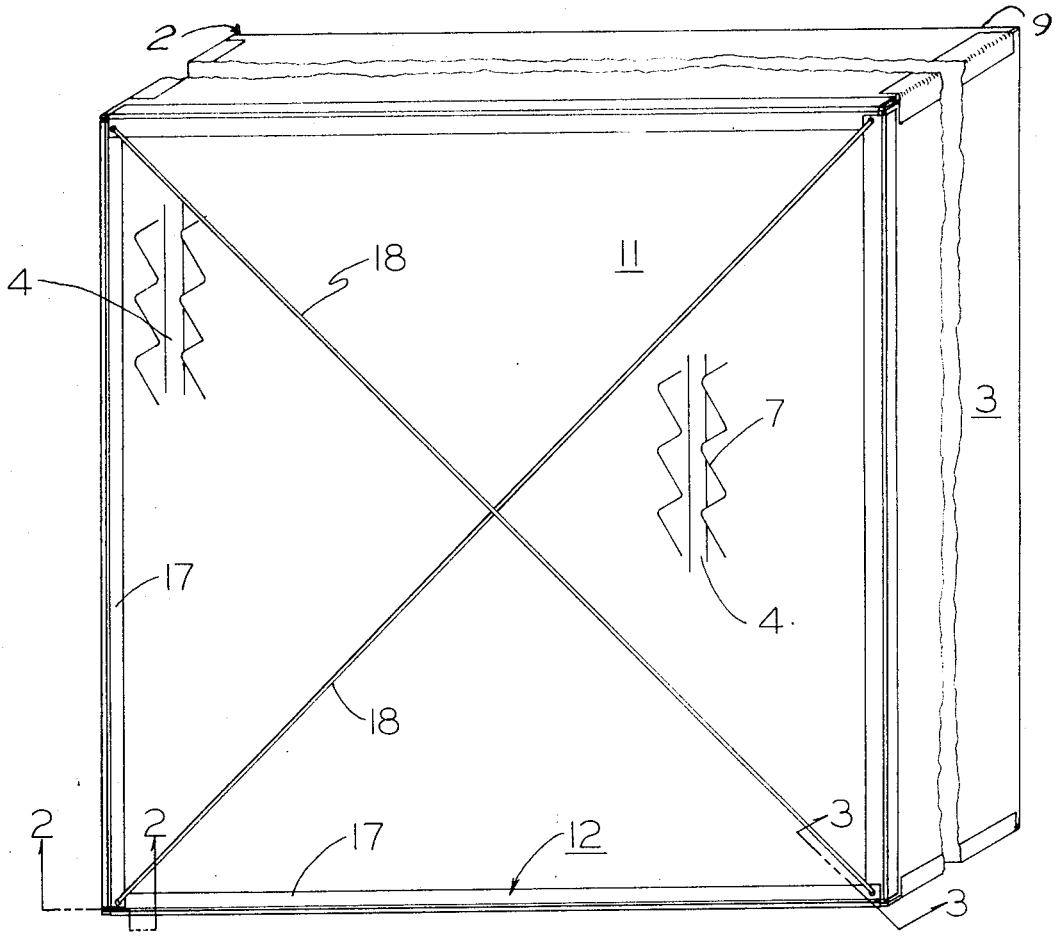
FIG. 1 is a partially broken isometric view of the unit filter assembly incorporating the novel features of the present invention.

Referring to FIG. 1 of the drawings, rectangular filter assembly 2 is disclosed. Filter assembly 2 includes a rectangular filter frame 3 which serves to support filter medium 4 therein. Filter medium 4 can be in the form of a sheet extending back and forth in pleated fashion upon itself to be transverse the fluid stream to be treated, the walls of the pleats of filter medium being held in spaced relation from each other by corrugated spacer members 7. Such type of filter assemblies are generally known in the art and therefore the assembly of the filter medium within the frame itself is not disclosed in detail. Assemblies of this type are most commonly used where high filtering efficiencies are desired, providing the maximum amount of filter medium in a given space.

Filter frame 3 can be made from any one of a number of suitably rigid materials and advantageously pressed fiber board materials can be used. A suitable sealant can be utilized between the edges of the filter medium 4, spacer members 7 and the inner surface of filter frame 3 to prevent fluid leakage therearound (not shown in detail).

The upstream and downstream edges of frame 3 define open upstream and downstream faces 9 and 11 to permit flow of the fluid stream to be treated therethrough. To protect the edge of frame 3 and to prevent bowing of the frame, a novel border flange 12 of the present invention is utilized. Border flange 12 as disclosed in the FIGS. 2 and 3 can be fabricated by roll forming from an integral blank of suitable, hard, wear-resistant, flexible material such as galvanized sheet metal. In the embodiment disclosed border flange 12 is comprised of two pairs of spaced parallel side members arranged on opposite sides of the edge of border frame 3. Each flange 12 (FIG. 2) is provided with a base portion 13 and a pair of opposed inner and outer leg portions 14 and 16, respectively, which leg portions 14 and 16 are turned to extend normal to the base portion 13 in parallel relation to each other.

Base portion 13 is of a breadth substantially equal to the thickness of the filter frame 3 to abut against the edge thereof with the inner and outer legs 14 and 16 of the flange abutting against the inner and outer surfaces of filter frame 3, respectively. The inner leg portion 14 has a terminal filter medium restraining portion 17 extending normal therefrom to restrain the peripheral face of filter medium 4 disposed in filter frame 3.

It is to be noted (as at 20, FIG. 2), that the extremities of terminal restraining portions 17 of one pair of sides of the border flange overlap the extremities of the terminal restraining portions 17 of the other pair of sides of the border flange at the corners thereof.

In accordance with the present invention, a pair of rods 18 fabricated from some suitable resilient metallic material are provided to be mounted on the frame in diagonally crossed relation to connect diametrically opposed corners of the terminal restraining portions of the border flange. It is to be noted that the rod members 18 are sized to retain the border flange 12 on the frame 3 in a manner described more fully hereinafter.

Figure 2:
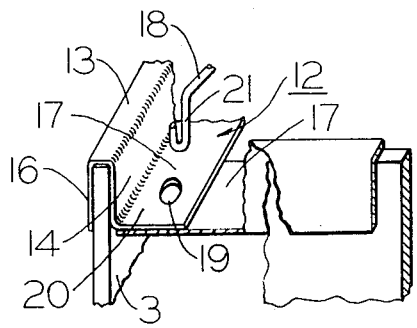
FIG. 2 is an enlarged, partially broken away cross-sectional view of a portion of the filter assembly of FIG. 1 taken in a plane through line 2—2 of FIG. 1.

As can be seen in FIG. 2 of the drawings, the overlapping extremities of the terminal restraining portions 17 of the sides of border flange 12 have aligned apertures 19 therein, the rod members 18 having a resilient hook shaped contour 21 at the extremities thereof, the hook 21 being sized to pass through aligned apertures 19 upon compression to be retained in position upon release of compression.

Figure 3:
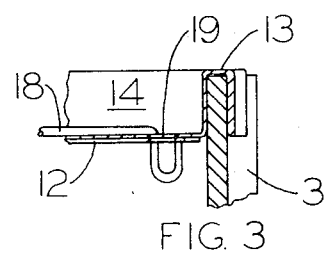
FIG. 3 is an enlarged, partially broken away cross-sectional view of another portion of the filter assembly of FIG. 1 taken in a plane through line 3—3 of FIG. 1.

Once the rod members 18 are so positioned that their hook extremities are aligned with overlying apertures 19, it is a simple matter to merely compress hooks 21 inwardly by pushing on the rod members so that the hooks pass through the apertures to be locked into position as is shown in FIG. 3. As aforementioned, the rod members 18 can be sized in length to urge outer leg portions 16 of border flange 12 against the outer surface of frame 3, insuring that the border flanges are properly retained on frame 3. It is to be understood that the sizing of rod members 18 can also be determined to cause the inner walls 14 to press against the inner surface of frame 3.

From the above description it can be seen that a straight-forward, economical filter frame assembly is provided which is sufficiently sturdy to avoid problems of racking and bowing and which is so constructed as to minimize fluid leakage.

The invention claimed is:

1. A unit filter assembly comprising: a rectangular filter frame including upstream and downstream edges defining open upstream and downstream faces to permit fluid flow therethrough; a filter medium disposed within said frame transverse the direction of fluid flow between said upstream and downstream faces; a rectangular border flange for said filter frame; said flange having a base portion and a pair of opposed inner and outer leg portions extending therefrom, said base portion being of a breadth substantially equal to the thickness of said filter frame to abut against the edge thereof with the inner and outer leg portions of said flange abutting against the inner and outer surfaces of said filter frame respectively, said inner leg portion having a terminal filter medium restraining portion extending normal therefrom to restrain the periphery of a face of said filter medium disposed in said filter frame; the extremities of the terminal restraining portion of one pair of sides of said border flanges overlapping the extremities of the terminal restraining portion of the other pair of sides of said border flange at the corners thereof; and rod means extending between diametrically opposed corners of said border flange, said rod means being sized in length to retain said border flange on said frame with the extremities of said rod means connecting said overlapping extremities of said terminal restraining portion.

2. The apparatus of claim 1, said overlapping extremities having aligned apertures therein, said rod means having a resilient hook shaped contour at the extremities sized to pass through said aligned apertures upon compression to be retained in position upon release of compression.

3. The apparatus of claim 1, said rod means comprising a pair of crossed diagonally extending resilient rod members.

References Cited
UNITED STATES PATENTS

| | | | |
|---|---|---|---|
| 2,754,928 | 7/1956 | Hambrecht et al. | 55—dig. 31 |
| 1,596,950 | 8/1926 | Semonin | 55—dig. 31 |
| 3,237,387 | 3/1966 | Haugen et al. | 55—dig. 31 |

SAMIH N. ZAHARNA, Primary Examiner

F. F. CALVETTI, Assistant Examiner

U.S. Cl. X.R.

55—490, Dig. 31